July 25, 1950  E. F. SARVER  2,516,425
VALVE
Filed Jan. 11, 1945  2 Sheets-Sheet 1

INVENTOR.
Emmett F. Sarver
BY
Fishburn Mullendore
Attorneys.

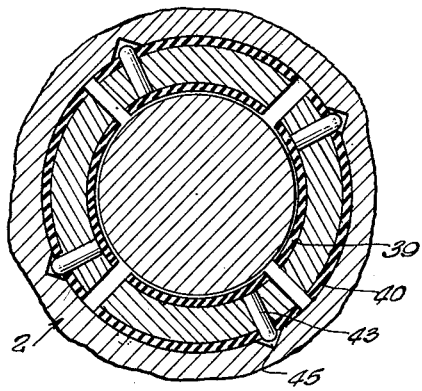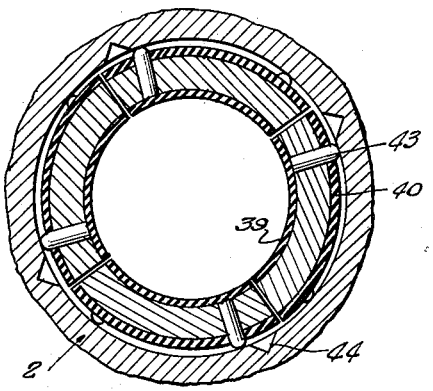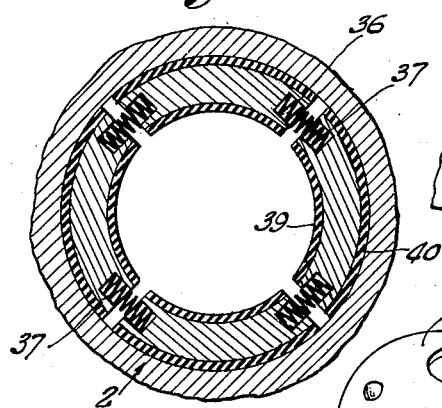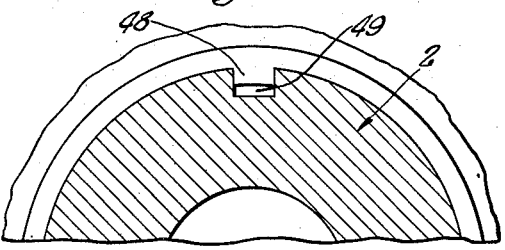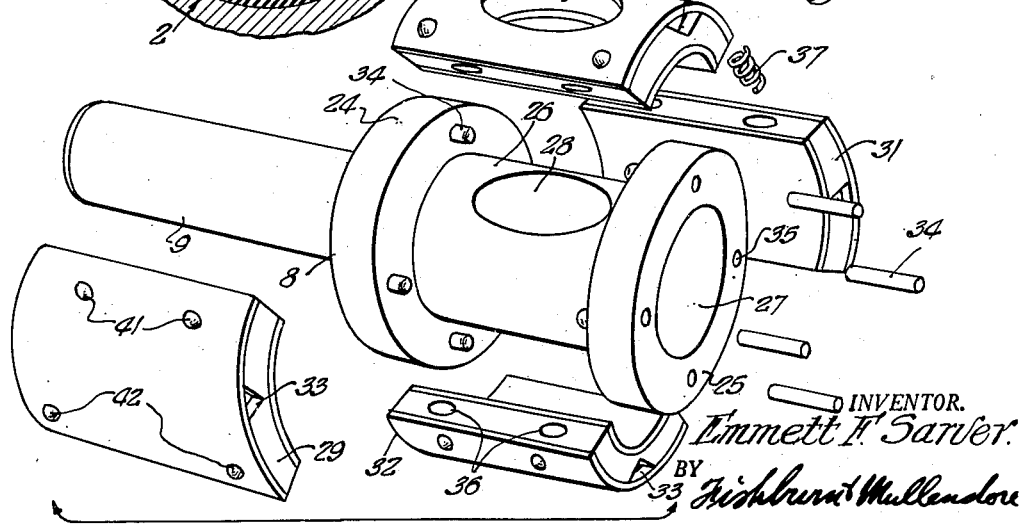

Patented July 25, 1950

2,516,425

UNITED STATES PATENT OFFICE 2,516,425

VALVE

Emmett F. Sarver, Erie, Pa., assignor to Rohm Manufacturing Company, Inc., Erie, Pa., a corporation of Kansas Application January 11, 1945, Serial No. 572,268

6 Claims. (Cl. 251—102)

This invention relates to valves, and particularly to valves commonly known as "plug valves," adaptable for use in handling non-lubricating fluids such as gasoline.

Heretofore, valves of this character have had certain undesirable characteristics, in that they have a tendency to stick when used in a line through which non-lubricating fluids, such as gasoline, are flowed. Various attempts have been made to overcome this difficulty by using tapered plugs urged inwardly by spring means, but this arrangement has not proved satisfactory. Such plug valves have been difficult to manufacture for the reason that the inside of the housing in which the plug works must be ground or honed to a very smooth finish and very fine precision. Both the plug and housing of such valves also have a tendency to wear and thus start leaking, particularly if there is any abrasive material in the fluid being handled by the valve.

It is, therefore, the principal objects of the present invention to overcome the foregoing difficulties; to provide a collapsible plug for a valve as described; to provide a facing for the plug having a semi-soft material, such as synthetic rubber or the like; to seal passageways through the valves; to provide for turning and expanding the plug; to provide a valve mechanism consisting of a rotor having a number of rubber face segments mounted on the rotor; to provide means for urging the segments outwardly against the housing; to provide mechanical means for forcing the segments inwardly; to provide a valve having a smooth interior contour; to provide a valve which will lessen the possibility of vapor lock; to provide a valve having a low pressure drop across the valve of a high velocity stream, and to provide a valve simple, economical, and efficient in operation for the purpose set forth.

In accomplishing these and other objects of the invention, I have provided improved details of structure, the preferred forms of which are illustrated in the accompanying drawings, wherein:

Fig. 4 is a transverse cross-sectional view through the rotor of the valve, particularly illustrating the valve in closed position.

Fig. 5 is a transverse cross-sectional view of the rotor, particularly illustrating the pins for depressing the segments of the rotor to open the valve.

Fig. 6 is a transverse cross-sectional view of the rotor particularly illustrating the segments and the spring means for expanding the segments.

Fig. 7 is a transverse cross-sectional view of the inlet port of the valve taken on line 7—7, Fig. 1.

Fig. 8 is a perspective view of the shaft and rotor embodying a part of my invention showing the parts in disassembled relation.

Figure 1:
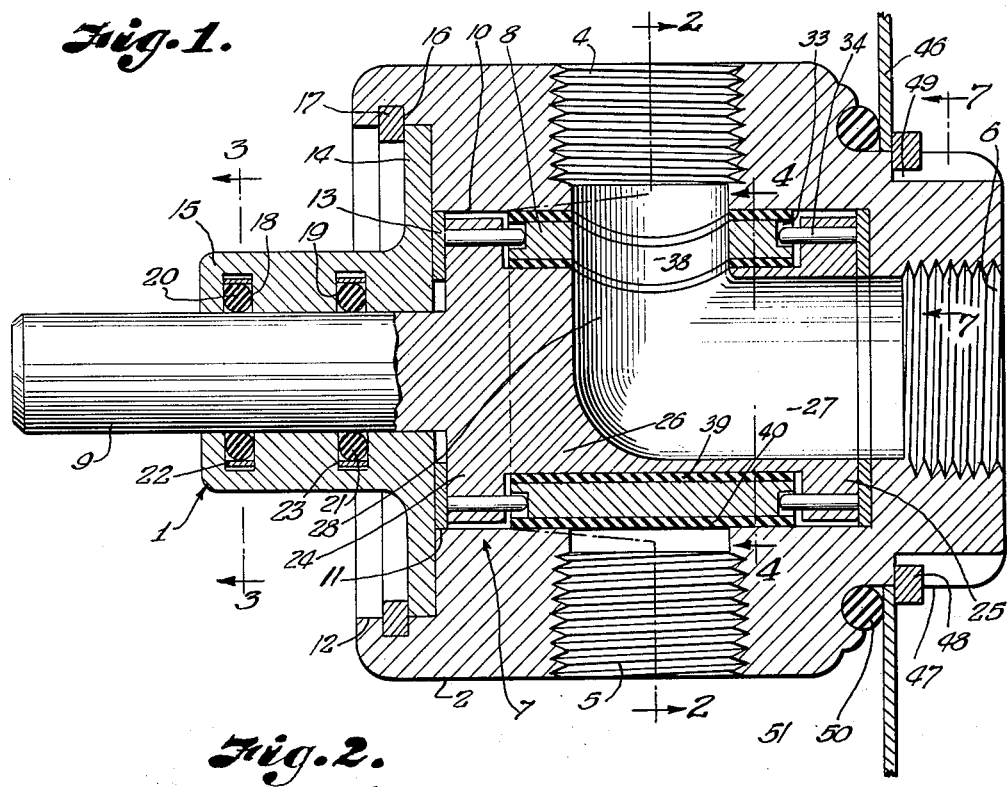
Fig. 1 is a longitudinal cross-sectional view of a valve involving the features of my invention.

Referring more in detail to the drawing:

I designates a valve embodying the features of my invention comprising a valve housing or body 2 having inlet ports 3, 4, and 5 and a discharge port 6. The valve housing 2 may be made of any suitable material, but I have found Duralumin preferably adapted to a valve of this type. The valve housing is provided with a chamber 7 adapted to receive a rotor 8 provided with a shaft 9.

The valve housing is provided with an opening 10 through which the rotor 8 may be inserted. The opening 10 is provided with offset annular shoulders 11 and 12. In order to seal the rotor in the housing, I provide a thrust washer 13 adapted to engage the face of the rotor and the annular shoulder 11. The washer may be made of any suitable material although I preferably use a hard fiber material for this purpose. The rotor is preferably held in place by an apertured plate 14 having a hub 15 to provide a bearing for the shaft 9. The plate 14 has an inner face adapted to engage against the thrust washer 13 and its outer periphery engaging the shoulder 12 in the opening of the housing. The shoulder 12 is provided with an annular groove 16 adapted to receive a split snap ring 17 for holding the plate 14 securely against the thrust washer 13 for providing a seal in the housing chamber.

Figure 3:
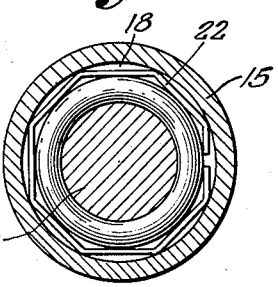
Fig. 3 is a transverse cross-sectional view taken on a line 3—3, Fig. 1, particularly illustrating the sealing means around the shaft of the rotor.

The inner circumference of the hub 15 is provided with annular grooves 18 and 19 adapted to receive sealing rings 20 and 21 preferably made of synthetic rubber or other suitable material adapted to engage around the shaft 9 of the rotor 8. I also provide split rings 22 and 23 preferably made of spring steel adapted to engage in the grooves 18 and 19 and exert an inward compressive force on the sealing rings 20 and 21 to provide a tight seal for the shaft in the bearing hub 15. If desired, the springs 22 may be of octagon shape to provide additional sealing force on the split ring 20 as illustrated in Fig. 3.

Referring specifically to the rotor embodying a feature of the present invention, the rotor proper consists of spaced circular circumferential flanges 24 and 25 rigidly secured to a hub 26. The shaft 9 is rigidly attached to the flange 24 in any suitable manner, and the opposite end of the rotor is provided with an opening 27 in the hub 26 adapted to align with the discharge port 6. The hub 26 is hollowed and provided with an opening 28 in one side connecting with the opening 27 for a purpose later described.

Arranged for engagement between flanges 24 and 25 around the hub 26, I preferably provide a plurality of segments, 29, 30, 31, and 32. Each of the side edges of the segments has faces adapted to mate with the face of an adjacent segment to form a snug fit when the segments are brought into close relation as later described. The ends of the segments are provided with V-shaped notches 33 adapted to receive inwardly extending pins 34 carried by the inner faces of the spaced flanges 24 and 25. The pins 34 may be inserted in the flanges through suitable openings 35 as best illustrated in Fig. 8.

Each mating edge of the segments 29, 30, 31, and 32 is provided with bore openings 36 located so that the said openings in each edge will align with the openings in a mating edge. The openings 36 are adapted to receive coil springs 37 which cooperate in holding the segments in alignment and exert pressure on the segments to expand the same for the purpose later described. The segment 30 is provided with an opening 38 of a size and conforming to the contour of the opening 28 in the hub 26 of the rotor when the segments are in assembled relation.

Segments 29, 30, 31, and 32 may be made of any suitable material but are preferably made of steel and their inner faces are provided with resilient material 39, such as synthetic rubber or the like, which may be rigidly attached to said segments by any suitable means, such as brazing. The outer face of 40 of the segments are also provided with a resilient covering, such as synthetic rubber or the like, to provide two resilient faces cooperating to provide a tight seal as later described.

Each of the segments 29, 30, 31, and 32 are provided with spaced openings 41 and 42, the opening 41 being slightly closer together than the opening 42. Openings 41 and 42 are adapted to receive pins 43 adapted to fit snugly in said openings. The valve housing 2 is provided with V-shaped notches 44 as best illustrated in Figs. 4 and 5. The outer ends of the pins 43 are rounded as indicated in 45 and extend slightly beyond the outer faces of said segments. The pins are adapted to engage in the notches 44 and are held in such notches by the springs 37 exerting outward pressure on the segment sections.

My improved valve may be mounted on a bracket 46 having an opening therein adapted to fit around the outer circumference 47 of the discharge port 6. The outer circumference 47 of the discharge port 6 is provided with an annular groove 48 adapted to receive a snap ring 49 having its inner face engaging the bracket 46. The opposite side of the bracket 46 is preferably cushioned by a circular ring 50 made of rubber or other resilient material adapted to seat in an annular groove 51 around the outer circumference of the valve housing 2. The rubber ring 50 provides a cushion for the valve mounted on the bracket 46 and is firmly held in place by the snap ring 49.

Figure 2:
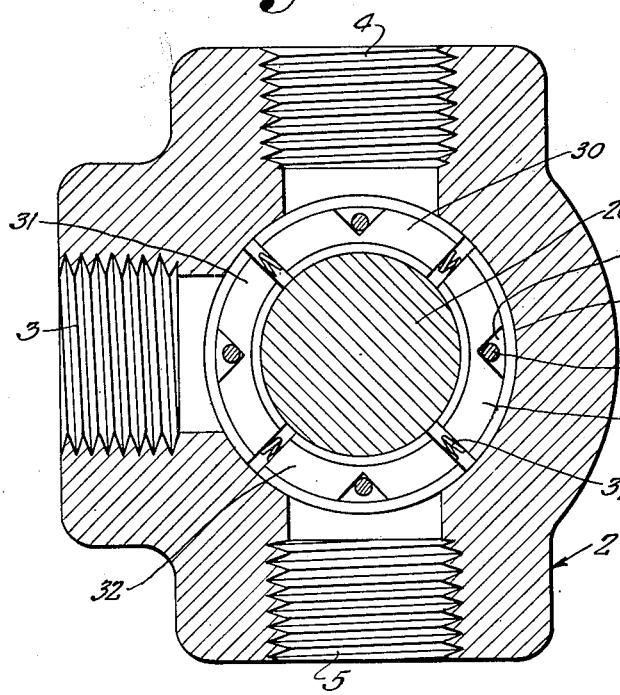
Fig. 2 is a transverse cross-sectional view of the valve taken on a line 2—2, Fig. 1.

Operation of a device constructed and assembled as described is as follows:

Referring particularly to Fig. 1 and assuming there is a valve to be set with inlet port 4 open as shown, it will be noted (Fig. 2) that the segments 29, 30, 31, and 32 will be held on the rotor spool by the pins 34 engaging in the notches 33 in said segments and when the segments are expanded outwardly against the valve housing by the spring 37 the inlet ports 3 and 4 will be sealed. The opening 28 in the hub of the rotor spool, will be aligned with the opening 38 in segment 30 which in turn will be in alignment with inlet port 4. It will be noted that the opening 38 aligning with port 4 and opening 28 in the hub of the rotor spool all align and the rubber faces of the segments seal around the opening to the rotor thus providing a smooth wall for the passageway of fluids so that no turbulence will be caused in the fluid stream as the rubber faces on the inside of the segments cooperate in providing this smooth surface. It will be noted there are no sharp corners in the fluid line or valve housing. The fiber washer 13 fills the space between the rotor and housing, smoothing the passageway through the discharge port 6 and the rubber faces on the segments smooth the passageway from the rotor to the inlet ports.

When it is desired to change the position of the valve, torque is applied to the shaft 9 of the rotor which acts through the pins 34 to create a thrust on the segments 29, 30, 31, and 32 thus causing the segments to rotate. Rotation of the rotor will cause the index pins 43 to contact the inside faces of the notches 44 in the wall of the housing and when sufficient pressure is applied to rotate the shaft the pins will cause the segments to be depressed and the pins will be forced out of the notches 44 and ride around the inner surface of the valve housing, thus causing depression of the segments tending to urge them toward the axis of the shaft and simultaneously urging the segments to rotate. The segments will not rotate until they have traveled inward a sufficient distance to disengage the pins 43 from the notches 44. Consequently, the torque created on the segments by the pins 34 will cause no rotary motion until the inward thrust created by the pins causes the segments to move inward a sufficient distance to relieve the compression on the rubber faces 40 against the housing, at the same time compressing the rubber face 39 on the inside of the segments so that the valve will then be free to turn.

The index pins 43 are so designed in length and contour that when the segments are revolving against the index pins the rubber face 40 will clear the inner face of the housing 2. When the valve has been turned a sufficient distance desired for the new position, the segments are again in such a position relative to the index pins 43 that the segments will travel outwardly against the inner face of the housing 2 and seal all of the inlet ports 3, 4, and 5.

From the foregoing it will be obvious that I have provided an improved valve which is simple in structure and overcomes the difficulties of sticking and rapid wear, and eliminates fine precision in manufacture. The rubber face 40 of the segments does not rotate against the housing, and any abrasive material between said face and housing will not do any material damage.

What I claim and desire to secure by Letters Patent is:

1. A valve of the character described, including a housing, having inlet ports and a discharge port, a rotor in said housing, including a hub having spaced flanges thereon, said hub having a fluid channel aligning with said discharge port, a plurality of segments for engaging between said flanges, one of said segments having an opening therein aligning with the opening in said hub, pins on said flanges for anchoring said segments between said flanges, the side edges of said segments having openings for receiving springs for expanding said segments, notches having cam surfaces in the inner wall of said housing, and means in said segments for engaging said notches, whereby rotation of said rotor will cause said pins to disengage from said notches to depress said segments for rotation thereof to close said valve.

2. A valve of the character described, including a housing having inlet ports and a discharge port, a rotor in said housing including a hub having spaced flanges thereon, said hub having a fluid channel aligning with said discharge port, a plurality of segments for engaging between said flanges, one of said segments having an opening therein aligning with the fluid channel in said hub, pins on said flanges for anchoring said segments between said flanges, the side edges of said segments having openings for receiving springs for expanding said segments, V-shaped notches in the inner wall of said housing, pins in said segments for engaging said notches, whereby rotation of said rotor will cause said pins to disengage from said notches to depress said segments for rotation thereof to close said valve.

3. A valve of the character described, including a housing having inlet ports and a discharge port, a rotor in said housing including a hub having spaced flanges thereon, said hub having a fluid channel aligning with said discharge port, a plurality of segments for engaging between said flanges, one of said segments having an opening therein aligning with the opening in said hub, means for anchoring said segments between said flanges, the side edges of said segments having openings for receiving springs for expanding said segments, V-shaped notches in the inner wall of said housing, pins in said segments for engaging said notches, whereby rotation of said rotor will cause said pins to disengage from said notches to depress said segments for rotation thereof to close said valve.

4. A valve of the character described, including a housing having inlet ports and a discharge port, a rotor in said housing having a shaft extending outside of said housing, said rotor including a tubular hub having spaced flanges thereon, one end of said hub being open and aligning with said discharge port and having an opening in one side forming a fluid channel, a plurality of segments for engaging between said flanges, one of said segments having an opening therein aligning with the opening in the side of said hub, means for loosely anchoring said segments between said flanges, the side edges of said segments having openings for receiving springs for expanding said segments, notches having cam surfaces in the inner wall of said housing, means in said segments for engaging said notches, whereby said segments will be expanded and depressed to open and close said valve upon rotation of said shaft.

5. A valve of the character described, including a housing having inlet ports and a discharge port, a rotor in said housing having a shaft extending outside of said housing, said rotor including a hub having spaced flanges thereon, said hub having a fluid channel aligning with said discharge port, a plurality of segments for engaging between said flanges, said segments having their inner and outer faces lined with a resilient material, and one of said segments having an opening therein aligning with the fluid channel in said hub, means for loosely anchoring said segments between said flanges, the side edges of said segments having openings for receiving coil springs for exerting pressure on said segments, notches having cam surfaces in the inner wall of said housing, and means in said segments for engaging said notches, whereby rotation of said shaft will cause said segments to rotate in the housing to open and close said valve.

6. A valve of the character described, including a housing having inlet ports and a discharge port, a rotor in said housing having a shaft extending outside of said housing, said rotor including a hub having spaced flanges thereon, said hub having a fluid channel aligning with said discharge port, a plurality of segments for engaging between said flanges, said segments having a rubber lining on their inner and outer faces and one of said segments having an opening therein aligning with the opening in said hub, means for anchoring said segments between said flanges, the side edges of said segments having openings for receiving coil springs for expanding said segments, notches having cam surfaces in the inner wall of said housing, pins extending through said segments for engaging said notches, whereby rotation of said shaft will cause said segments to rotate in the housing to open and close said valve.

EMMETT F. SARVER.

REFERENCES CITED

The following references are of record in the file of this patent:

UNITED STATES PATENTS

| Number | Name | Date |
| --- | --- | --- |
| 731,942 | Parson | June 23, 1903 |
| 1,750,257 | Bonnell | Mar. 11, 1930 |
| 2,110,098 | Strecker | Mar. 1, 1938 |
| 2,139,259 | Corbett | Dec. 6, 1938 |
| 2,235,306 | Atkinson | Mar. 18, 1941 |
| 2,246,801 | Johnson | June 24, 1941 |
| 2,289,270 | Johnson | July 7, 1942 |
| 2,314,512 | Parker | Mar. 23, 1943 |
| 2,342,963 | Ohls | Feb. 29, 1944 |
| 2,383,983 | Melichar | Sept. 4, 1945 |
| 2,385,993 | Johnson | Oct. 2, 1945 |